(12) United States Patent
Batisson et al.

(10) Patent No.: US 11,781,456 B2
(45) Date of Patent: Oct. 10, 2023

(54) METHOD FOR TREATING POLLUTANTS USING A THREE-WAY CATALYST WHEN STARTING UP A COMBUSTION ENGINE

(71) Applicant: NISSAN MOTOR CO., LTD., Yokohama (JP)

(72) Inventors: Cathy Batisson, Yvelines (FR); Bruno Peressini, Yvelines (FR)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/635,477

(22) PCT Filed: Sep. 8, 2020

(86) PCT No.: PCT/EP2020/075008
§ 371 (c)(1),
(2) Date: Feb. 15, 2022

(87) PCT Pub. No.: WO2021/048084
PCT Pub. Date: Mar. 18, 2021

(65) Prior Publication Data
US 2022/0397047 A1    Dec. 15, 2022

(30) Foreign Application Priority Data
Sep. 11, 2019    (FR) ...................... 1910020

(51) Int. Cl.
*F01N 3/20* (2006.01)
*F01N 3/22* (2006.01)

(52) U.S. Cl.
CPC ............. *F01N 3/20* (2013.01); *F01N 3/22* (2013.01)

(58) Field of Classification Search
CPC . F01N 3/101; F01N 3/32; F01N 3/225; F01N 2900/1624; F01N 2560/025; F01N 1/14
See application file for complete search history.

(56) References Cited

U.S. PATENT DOCUMENTS

| 5,410,872 | A  | * | 5/1995  | Adamczyk, Jr. | ........ F01N 3/222 60/276 |
| 2009/0293450 | A1 | * | 12/2009 | Gonze | ....................... F01N 3/22 60/284 |
| 2011/0203551 | A1 | * | 8/2011  | Russ  | .................... F02D 41/0007 123/406.45 |
| 2011/0283676 | A1 | * | 11/2011 | Reichelderfer | ........... F01N 9/00 60/299 |
| 2020/0116061 | A1 | * | 4/2020  | Hupfeld | ................. B60N 2/002 |
| 2021/0087990 | A1 | * | 3/2021  | Paukner | ................ F01N 3/0864 |
| 2021/0199041 | A1 | * | 7/2021  | Furui | ...................... F01N 11/00 |

FOREIGN PATENT DOCUMENTS

| DE | 10 2017 107 678 A1 | 10/2018 |
| DE | 10 2017 113 366 A1 | 12/2018 |
| FR |     2778206 A1     | 11/1999 |

* cited by examiner

*Primary Examiner* — Anthony Ayala Delgado
(74) *Attorney, Agent, or Firm* — Foley & Lardner LLP

(57) ABSTRACT

The invention relates to a method involving the treatment of the pollutants emitted by a vehicle having a heat engine, in which catalyst means (3) are heated, characterised in that the amount of oxygen (OS) in the catalyst means (3) is controlled to be over a minimum amount of oxygen (OS1) by injecting air upstream of said catalyst means (3).

9 Claims, 2 Drawing Sheets

[Fig 1]
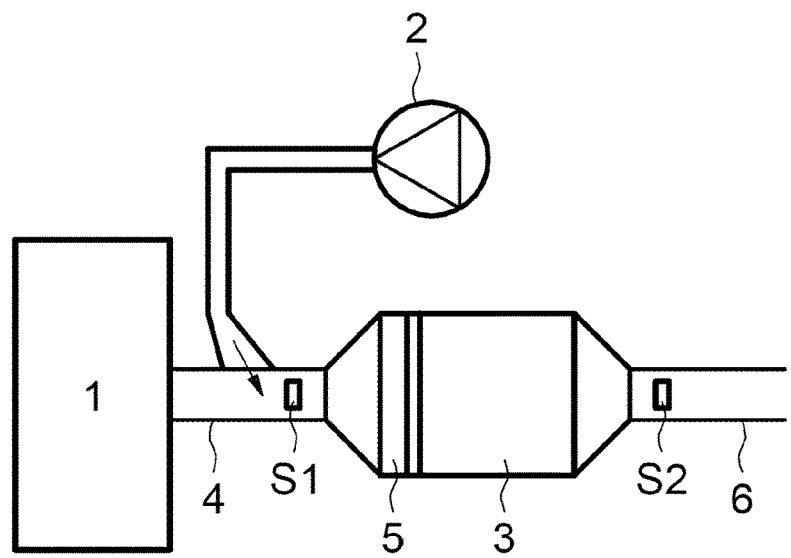
[Fig 2]
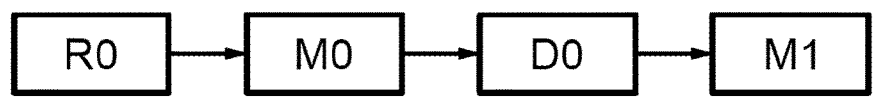

[Fig 3]
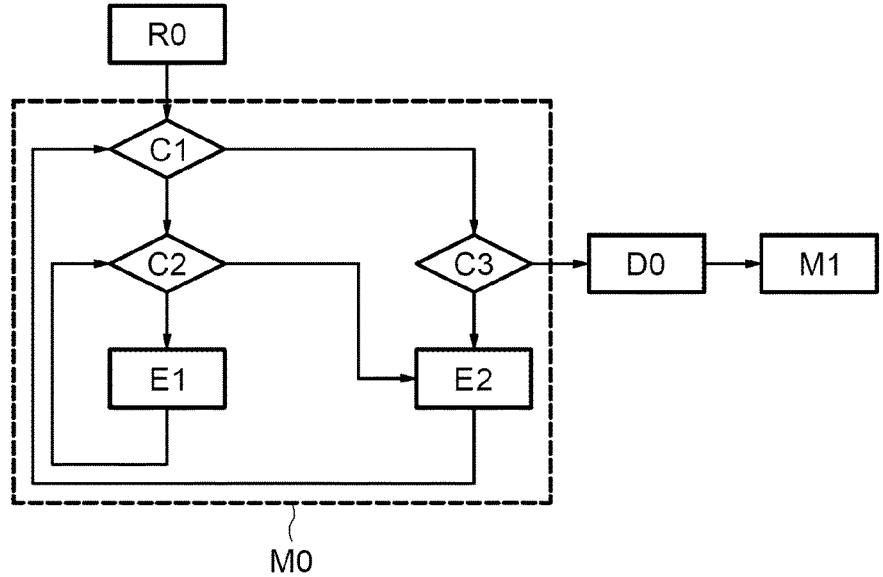
[Fig 4]
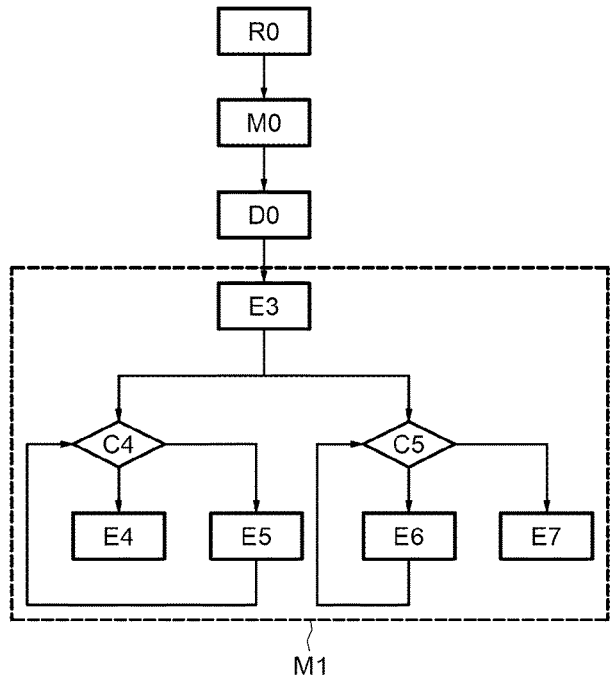

METHOD FOR TREATING POLLUTANTS USING A THREE-WAY CATALYST WHEN STARTING UP A COMBUSTION ENGINE

TECHNICAL FIELD

The present invention relates to the field of catalytic converters intended to treat the exhaust gases of internal combustion engines, notably those emitted by vehicles, with a view to reducing the emissions, on engine start-up, of pollutant components such as carbon monoxide, nitrogen oxides or unburnt hydrocarbons.

In order for a catalytic converter to effectively treat these pollutant emissions in the exhaust, its temperature needs to be above a threshold lightoff temperature which is generally reached by the heating of the catalytic converter by the exhaust gases passing through it.

The time taken for the catalytic converter to reach this temperature may be long. This results in the emission of a significant volume of untreated gas which contains pollutants the quantity of which is liable to be excessively high, either in relation to the standards in force, or in relation to a self-imposed objective lower than that of said standards.

It is known practice, for example from patent application FR2778206A1, to achieve the increase in temperature of the catalyst by heating the gases entering the latter prior to engine start-up.

However, it has been found that this solution does not provide a satisfactory reduction in the pollution because it makes no provision for regulating the quantity of oxygen in the catalyst. Thus, just after engine start-up, it may be that the hydrocarbon treatment capacity is low, even if the temperature is high, on account of a lack of oxygen.

The present invention seeks to reduce the emission of pollutant components by combining catalyst temperature regulation and oxygen regulation.

In the light of the foregoing, the subject of the invention is a method for the treatment of the pollutants emitted by a combustion engine, wherein catalysis means are heated, and the quantity of oxygen in the catalysis means is regulated so that it remains above a minimum quantity of oxygen by injecting air upstream of the catalysis means.

As a preference, the catalysis means are heated beyond a preheat threshold temperature before the quantity of oxygen in the catalysis means is regulated.

For example, the heating of the catalysis means is performed before a starting of the engine is authorized.

Advantageously, the regulation of the quantity of oxygen in the catalysis means is performed before a starting of the engine is authorized.

According to one embodiment, the regulation of the quantity of oxygen and the heating of the catalysis means are carried out after a request to start the engine is detected.

In one embodiment, the quantity of oxygen in the catalysis means is kept above a stoichiometric oxygen-richness threshold after a starting of the engine.

Advantageously, the heating element is switched off if the temperature of the catalysis means exceeds a steady-state temperature threshold after a starting of the engine.

The method may further comprise a step during which the quantity of oxygen in the catalysis means is increased beyond a stoichiometric oxygen-richness threshold after a starting of the engine and once the heating element is switched off.

As a preference, the quantity of oxygen in the catalysis means is regulated to keep it substantially around a stoichiometric oxygen-richness threshold after said stoichiometric richness threshold has been exceeded.

The invention also relates to a method wherein a preheating grid of a heating element is heated up to a minimum grid temperature before the catalysis means are heated with said heating element.

In this way it becomes possible to achieve satisfactory operation of the catalytic system right from engine start-up. This then results in a significant reduction in the amount of pollutants emitted, particularly when a vehicle equipped with such a catalytic system is driving in town over short journeys leading to frequent starts.

BRIEF DESCRIPTION OF THE DRAWINGS

The invention will be better understood from making a detailed study of a number of embodiments considered by way of nonlimiting examples and illustrated by the attached drawings, in which:

FIG. 1 schematically depicts a system used for implementing a treatment of the pollutants emitted by a combustion-engined vehicle using catalysis means;

FIG. 2 illustrates an example of implementation of the treatment system of FIG. 1;

FIG. 3 details the steps of the implementation of FIG. 2 prior to engine start-up; and FIG. 4 details the steps of the implementation of FIG. 2, after engine start-up.

DETAILED DESCRIPTION

Reference is made to FIG. 1 which illustrates one embodiment of the system used for implementing a treatment of the pollutants emitted by a vehicle with a combustion engine 1 using catalysis means 3 placed after the exhaust 4 from the engine 1.

The catalyst 3 comprises a three-way catalytic converter 3 provided with so-called "precious" metals such as palladium, platinum or rhodium. It is intended to treat the exhaust gases leaving an exhaust pipe 6, using three parallel chemical reactions of oxidizing the carbon monoxide, oxidizing the hydrocarbons and reducing the nitrogen oxides.

A number of catalysts may be provided in series.

The catalyst 3 comprises an impregnation surface (known as a "washcoat"), containing compounds based on cerium oxide which are capable of storing or releasing oxygen very quickly to encourage the catalytic reactions.

The catalyst 3 is effective only above around four hundred degrees Celsius. In the current state of the art, short journeys do not give the catalytic converter enough time to warm up sufficiently.

The system for the treatment of the pollutants therefore comprises, in addition, heating means 5 intended to release heat via the Joule effect to the catalyst 3, for example via a preheating grid consisting of an electrically resistive metal element through which a current passes. The heating element 5 may be positioned upstream of the catalyst 3 in the direction in which the gases flow, or on the catalyst 3.

The treatment of the pollutants also employs air-circulating means 2 designed to deliver air upstream of the catalyst 3, for example an air-circulation pump 2 comprising a compressor blowing into the exhaust line 4, 6.

Control means are configured to establish the connection between probes S1, S2 for oxygen content and for temperature which are positioned upstream or downstream of the catalyst 3 and inter-system communications networks having, for example, a CAN bus, for controlling the heating means 5 and the air pump 2 via a computer embodied for example by an automotive computer comprising a processor.

For example, an upstream probe S1 controls the richness in terms of air or in terms of oxygen with respect to the fuel in the gases leaving the engine 1.

A downstream probe S2 may be provided for monitoring the oxygen richness Os at the outlet of the catalyst 3. The richness is defined as the level of fuel in the air, as estimated or measured by the probe S1, S2, with respect to a stoichiometric level of fuel in the air in the catalyst 3. The stoichiometric ratio is a level of fuel in the air that leads to a near-complete chain of catalysis reactions.

FIG. 2 illustrates one example of an implementation of a pollutant treatment system.

This implementation begins with a step R0 in which a desire to imminently switch on the engine 1 is detected, for example via a request to start the vehicle or the detection of the presence of a user.

To do that, a demand by a user to start the engine may be detected when the anti-start system is neutralized, when the vehicle ignition is switched on, or else when a door, notably the driver's door, of the vehicle is opened.

Alternatively, the presence of a seated user is detected, for example by detecting contact with a seat of the vehicle, using infrared detection or by detecting the pupils of a user.

The control means may be programmed via a vehicle dashboard control interface or via a remote device such as a multifunction telephone. In particular, the control means are configured to allow the system to be used without starting of the vehicle throughout step M0.

For example, the control means are configured to schedule daily, at a predefined time, an implementation of step R0, namely a confirmation of a wish to start the engine, which leads to step M0.

The control means may have been configured to take into account information regarding the quantity of electrical energy available in an electrical-charge accumulator of the vehicle, for example the vehicle battery, and if this information is available, step R0 may lead to the exiting of the strategy by ceasing to use the pollutant treatment system ahead of the use of the engine. In a context of use in which the vehicle battery is close to being discharged, the command to heat the catalyst during step M0 may thus be modulated or even canceled in order to give priority to the propelling of the vehicle.

When the control means recognize a request confirming a desire to start the engine 1, the method moves on to step C1 of step M0.

Step M0, which is detailed in FIG. 3, comprises steps C1, C2, E1, E2 and C3, by means of which the conditions favorable for catalysis are prepared before the engine 1 is allowed to start during step D0.

During step C1, the computer estimates a temperature TCAT of the catalyst 3 from at least one measurement from a temperature probe S1, S2 upstream and/or downstream of the catalyst 3 and compares it against a preheat threshold TCAT1 of the order of four hundred degrees Celsius.

The catalyst 3 may thus be at the lightoff temperature for the catalysis reactions when the engine 1 is started during step D0.

The computer 7 may further be configured to determine, for example during step C1, whether all the implementation means 2, 3, 5 and the sensors S1, S2 with which the vehicle 1 is equipped and which are going to be needed, are functional. Where appropriate, step C1 leads to step C2.

If a failure of one of the sensors S1, S2 needed or of the heating element 5 is detected, then provision may be made for a degraded mode to be declared during step C1.

The degraded mode of step C1 consists for example in issuing information, such as the displaying of an error signal on an instrument panel of the vehicle 1, accompanied by the exiting of the strategy, that is to say allowing a direct start without preheating or air injection.

The first, comparison, step C1 is repeated at regular time intervals, for example every ten milliseconds.

If the preheat temperature TCAT1 is not reached during step C1, this leads to step C2, if not it leads to step C3.

Step C2 consists in checking, using a temperature probe, that the preheating grid is at a temperature higher than the minimum grid temperature TGRID. If appropriate, step C2 is continued by step E1, if not it moves on to step E2.

For a maximum efficiency of catalysis upon the starting of the engine 1, the preheating of the heating grid 5 is accompanied by actuation of the air-circulation pump 2 so that the heat produced by the heating grid can be transferred to the catalyst 3 situated downstream of said heating grid in the absence of a flow of gas coming from the engine 1.

Step E1 therefore consists in electrically powering the heating element 5 and in switching off the pump 2 or keeping it switched off. Step E1 moves on to step C2. As long as the heating element 5 has not reached the temperature TGRID, the supply of electrical power passing through the preheating grid is maintained or increased.

Step E2 consists in switching on the heating element 5 or keeping it switched on and in switching on the pump 2 or keeping it switched on. The air delivered upstream of the catalyst 3 is then therefore drawn from the oxygen-laden ambient air and circulates through the preheating grid to allow the catalyst 3 to be preheated prior to the starting of the engine 1.

During step C3, the quantity of oxygen OS in the catalyst 3 is compared with an oxygen content OS1 of the order of eight to ten moles per cubic meter. As long as the oxygen content OS is below the content OS1, step C3 moves on to step E2, if not it continues with step D0.

Step D0 consists in allowing and performing the starting of the engine 1. At the moment of the start-up, the pump 2 can be switched off and activation of the heating element 5 maintained. Step D0 is continued by step E3 and the collection of steps M1.

The collection of steps M1 comprises steps E3, C4, E4, E5 and C5, E6, E7 which are performed successively at regular intervals, for example every ten milliseconds.

Step E3 consists in stopping the injection of air, for example by switching off the pump 2, as soon as the engine 1 is started. Step E3 is continued by steps C4 and C5 performed in parallel.

In order to burn the carbon monoxide that remains in the exhaust gases, the temperature TCAT of the catalyst 3 needs to be higher than a temperature threshold TCAT2 of the order of six hundred degrees Celsius and the quantity of oxygen Os in the catalyst needs to exceed an oxygen content threshold OS2 of the order of one to three moles per cubic meter.

The catalyst 3 is heated thermochemically by the exothermal catalysis reactions that supplement the electrical heating provided.

Step C4 consists in comparing the temperature TCAT of the catalyst 3 with the threshold TCAT2. If it exceeds TCAT2, the heating element 5 is switched off and its addition of heat is replaced with a thermochemical addition, if not the method returns to step E5 during which the heating element 5 is switched on or kept switched on and the current passing through it is maintained or increased.

Step C5 is a check that the oxygen content OS of the catalyst 3 has not dropped below an oxygen content threshold OS2. If the oxygen content OS of the catalyst 3 drops below the threshold OS2, step C5 is continued by step E6, if not, step C5 goes to step E7.

Step E6 consists in eliminating the carbon monoxide from the exhaust gases. To do that, a richness setpoint greater than one hundred percent, comprised between one hundred and ten and one hundred and forty percent, is imposed on the richness in the catalyst 3 or, in other words, the oxygen content OS is increased above stoichiometric quantities. This step moves on to step C5 as long as the heating element 5 is switched on, namely as long as the method has not passed beyond step E4. Step E6 may be maintained for five to sixty seconds once step E4 is passed, before moving on to step C5. Step E6 is therefore performed just once after engine start-up.

During step E7, the engine reaches a steady state and conventional richness regulation of the treatment system is activated. For example, a richness setpoint of substantially one hundred percent is sent to the control means.

In this way, the system evaluates and confirms the oxygen requirements of the catalyst and manages the attainment of adequate temperatures before and after engine start-up in order to limit the emissions of hydrocarbons, of nitrogen-containing compounds and of carbon monoxide.

The invention claimed is:

1. A method for the treatment of the pollutants emitted by a combustion engine, the method comprising:
   before the engine is started, preheating a catalyst using a heating element;
   detecting a temperature of the catalyst;
   in response to detecting that the temperature of the catalyst has exceeded a predetermined threshold temperature, regulating a quantity of oxygen in the catalyst by injecting air upstream of the catalyst;
   detecting a quantity of oxygen in the catalyst; and
   in response to detecting that the quantity of oxygen has reached a predetermined threshold quantity, allowing the engine to be started.

2. The method as claimed in claim 1, wherein the step of preheating the catalyst is started in response to a request to start the engine.

3. The method as claimed in claim 1, further comprising:
   after the engine is started, regulating the quantity of oxygen in the catalyst by injecting air upstream of the catalyst so as to maintain the quantity of oxygen in the catalyst above a stoichiometric oxygen richness threshold.

4. The method as claimed in claim 1, further comprising, after the engine is started, switching off the heating element in response to detecting that the temperature of the catalyst exceeds a steady-state temperature threshold.

5. The method as claimed in claim 4, further comprising, after the step of switching off the heating element, regulating the quantity of oxygen in the catalyst so as to maintain the quantity of oxygen in the catalyst above a stoichiometric oxygen richness threshold.

6. The method as claimed in claim 4, further comprising regulating the quantity of oxygen in the catalyst so as to keep the quantity of oxygen in the catalyst substantially around a stoichiometric oxygen richness threshold.

7. The method as claimed in claim 1 further comprising, before the step of preheating the catalyst using a heating element, heating a preheating grid of the heating element to a predetermined threshold grid temperature.

8. A method for the treatment of the pollutants emitted by a combustion engine, the method comprising:
   after the engine is started, heating a catalyst using a heating element;
   detecting a temperature of the catalyst;
   switching off the heating element in response to detecting that the temperature of the catalyst exceeds a steady-state temperature threshold;
   detecting a quantity of oxygen in the catalyst; and
   after the step of switching off the heating element, regulating the quantity of oxygen in the catalyst by injecting air upstream of the catalyst so as to maintain the quantity of oxygen in the catalyst above a stoichiometric oxygen richness threshold.

9. A method for the treatment of the pollutants emitted by a combustion engine, the method comprising:
   after the engine is started, heating a catalyst using a heating element;
   detecting a temperature of the catalyst;
   switching off the heating element in response to detecting that the temperature of the catalyst exceeds a steady-state temperature threshold;
   detecting a quantity of oxygen in the catalyst; and
   regulating the quantity of oxygen in the catalyst so as to keep the quantity of oxygen in the catalyst substantially around a stoichiometric oxygen richness threshold after the stoichiometric richness threshold has been exceeded.

* * * * *